(12) United States Patent
Godfrey et al.

(10) Patent No.: US 10,996,714 B1
(45) Date of Patent: May 4, 2021

(54) SLOTTED BASE DISPLAY DEVICE

(71) Applicant: Lenovo (Singapore) Pte. Ltd., Singapore (SG)

(72) Inventors: Cyan Godfrey, Chapel Hill, NC (US); Brian H. Leonard, Chapel Hill, NC (US); Cuong Huy Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/675,975

(22) Filed: Nov. 6, 2019

(51) Int. Cl.
*G06F 1/16* (2006.01)

(52) U.S. Cl.
CPC .......... *G06F 1/1632* (2013.01); *G06F 1/1643* (2013.01)

(58) Field of Classification Search
CPC ...................................................... H05K 5/00
See application file for complete search history.

(56) References Cited

U.S. PATENT DOCUMENTS

2004/0233620 A1* 11/2004 Doczy .................. G06F 1/1669
361/679.15

* cited by examiner

*Primary Examiner* — Jerry Wu

(74) *Attorney, Agent, or Firm* — Brian J. Pangrle

(57) ABSTRACT

A device can include a base that includes an upper surface and an opposing lower surface and a slot that includes an upper surface opening in the upper surface, a lower surface opening in the lower surface, a slot width that is greater than approximately 5 mm and less than approximately 25 mm and a slot length that is greater than approximately 50 mm and less than approximately 300 mm; an arm operatively coupled to the base; and a display housing operatively coupled to the arm, where the display housing includes display circuitry and a display surface.

20 Claims, 10 Drawing Sheets

SLOTTED BASE DISPLAY DEVICE

CROSS-REFERENCE TO RELATED APPLICATIONS

This application is related to commonly assigned U.S. patent application Ser. No. 16/676,038, entitled DISPLAY DEVICE, which has been filed on the same date as this application and which is incorporated by reference herein in its entirety.

TECHNICAL FIELD

Subject matter disclosed herein generally relates to computing and display devices.

BACKGROUND

A device can include a display and a base where the display is operatively coupled to the base via an arm.

SUMMARY

A device can include a base that includes an upper surface and an opposing lower surface and a slot that includes an upper surface opening in the upper surface, a lower surface opening in the lower surface, a slot width that is greater than approximately 5 mm and less than approximately 25 mm, and a slot length that is greater than approximately 50 mm and less than approximately 300 mm; an arm operatively coupled to the base; and a display housing operatively coupled to the arm, where the display housing includes display circuitry and a display surface. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
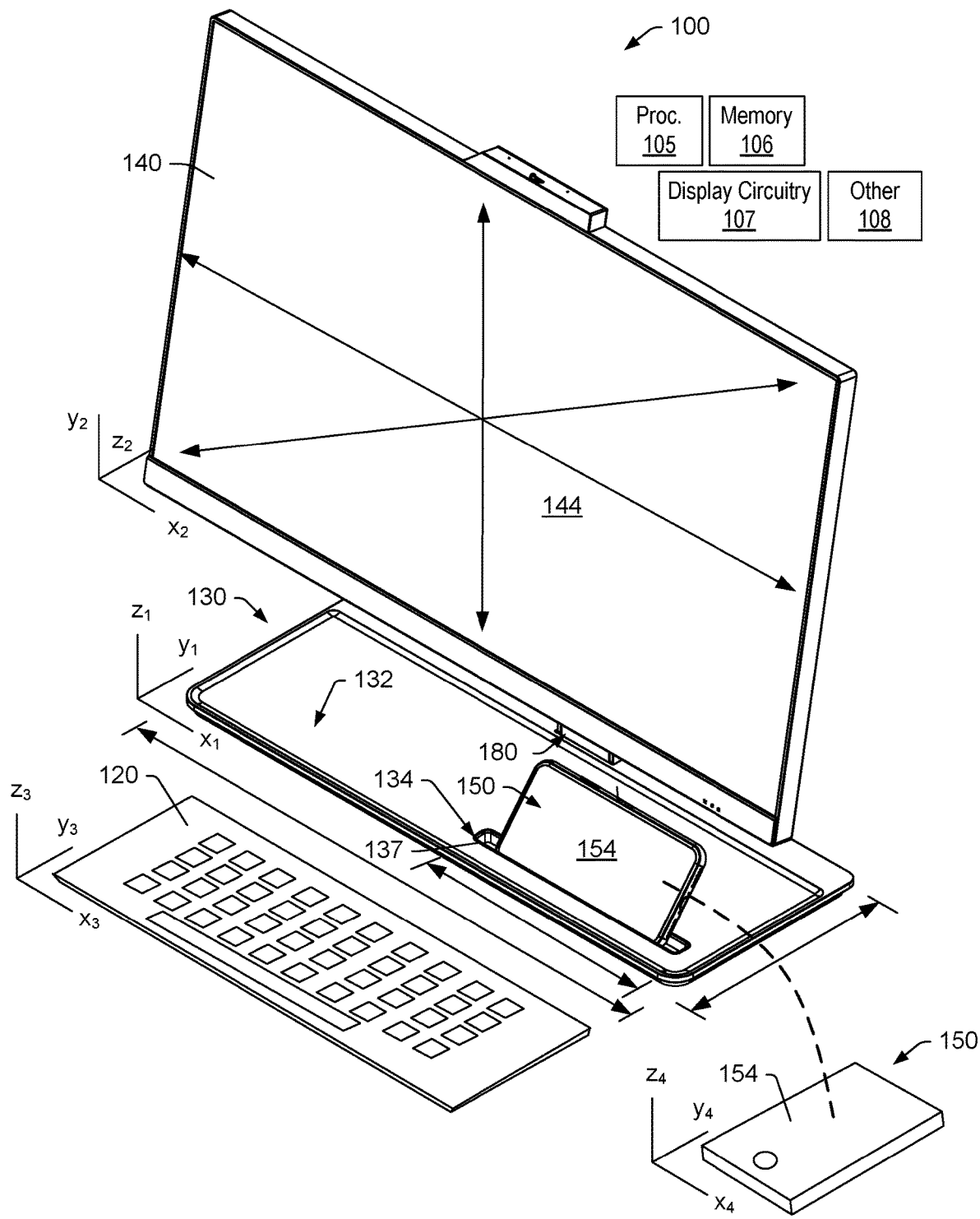
FIG. 1 is a perspective view of an example of a display device.

FIG. 1 shows an example of a computing device 100 that can include one or more processors 105, memory 106 accessible to at least one of the one or more processors 105, display circuitry 107 and one or more other components 108, which can include electronic circuitry, instructions stored in the memory 106 and executable by at least one of the one or more processors 105, etc.

As shown in FIG. 1, the computing device 100 includes a display housing 140 with a display surface 144 that may utilize one or more technologies (e.g., LED, LCD, etc.). The display circuitry 107 can be operatively coupled to at least one of the one or more processors 105, for example, to receive data, instructions, etc., for rendering text, graphics, images, etc., to the display surface 144. As an example, the display circuitry 107 can include one or more graphics processing units (GPUs) and, for example, one or more of the one or more processors 105 can be a central processing unit (CPU). As an example, the display circuitry 107 can include input circuitry such as touch circuitry, digitizer circuitry, etc., such that the display surface 144 is an input surface. For example, the display surface 144 may receive input via touch, a stylus, etc. As an example, the display housing 140 can be a housing for a touchscreen display where a finger, a stylus, etc., can be utilized; noting sensing as to input may occur with or without physical contact between a finger and the display surface 144, between a stylus and the display surface 144, etc., depending on the type of input circuitry utilized (e.g., resistive, capacitive, acoustic wave, infrared, optical, dispersive signal, etc.).

In the example of FIG. 1, the computing device 100 can include a keyboard 120, a base 130 that includes an upper surface 132 and a slot 134 with an upper surface opening 137, the display housing 140, an arm 180 that extends from the base 130 that can include an arm mount that couples the arm 180 to the display housing 140, for example, on a back side of the display housing 140 that is opposite the display surface 144 of the display housing 140. The computing device 100 may be referred to as a slotted base display device, as the base 130 includes at least one slot (e.g., the slot 134). The display surface 144 can be part of a display that includes display circuitry, which may include one or more types of touch, digitizer, etc., circuitry. The base 130 and the display housing 140 and/or the display surface 144 can be defined with respect to one or more coordinate systems such as, for example, one or more Cartesian coordinate systems (see, e.g., $x_1$, $y_1$, $z_1$ and $x_2$, $y_2$, $z_2$). The keyboard 120 and an another computing device (e.g., or a peripheral) 150 can be defined with respect to one or more coordinate systems such as, for example, one or more Cartesian coordinate systems (see, e.g., $x_3$, $y_3$, $z_3$ and $x_4$, $y_4$, $z_4$). In the example of FIG. 1, the base 130 includes the upper surface 132 as a substantially planar upper surface, which includes the slot 134 defined in part by the upper surface opening 137. As shown, the computing device 100 may be utilized with the keyboard 120, which may be dimensioned for placement on the upper surface 132 of the base 130, for example, to provide an organized workspace (e.g., consider storage of the keyboard 120 on the upper surface 132 when the keyboard is not being used, etc.). As an example, the slot 134 may support a mobile device 150 with a display surface 154, which may be utilized, for example, when the keyboard 120 or other component is not covering the opening 137 of the slot 134 of the base 130.

In the example of FIG. 1, the base 130 includes the slot 134, which may be a through-slot defined by an upper opening and a lower opening in the base 134, where the slot 134 receives a portion of the computing device 150, which may be a smartphone or another type of computing device that can be oriented in a planar orientation to be received at least in part in the slot 134. As shown, the slot 134 can be a linear slot that may be defined by a longitudinal slot axis and a cross-wise slot axis (e.g., orthogonal to the longitudinal slot axis). As an example, the longitudinal slot axis can be substantially parallel to a side of the base 130 or, for example, a slot may be at an angle to a side of the base 130. Where a slot is at an angle, consider an angle that may be defined by a centerline such as a centerline defined by the arm 180 where the longitudinal slot axis can intersect the centerline to define an angle. In the example shown in FIG. 1, the angle of the longitudinal slot axis is approximately 90 degrees to the centerline; whereas, a slot may be provided in a base with a slight tilt angle that is less than 90 degrees and, for example, greater than approximately 40 degrees. In such an example, a display surface 154 of the computing device 150 may be angled toward a centerline of a user that is positioned in front of the base 130, for example, consider a position where a user may utilize the keyboard 120 for touch typing, etc., where information is rendered to the display surface 144 and optionally rendered to the display surface 154 of the computing device 150.

As shown in the example of FIG. 1, the display surface 144 may be centered along a centerline of the computing device 100 and may be disposed at an angle that can be defined by the base 130 or a flat support surface such as a desktop, a tabletop, a countertop, etc., where the base 130 or the flat support surface can be planar and horizontal. As shown, the arm 180 rises from the base 130 at an angle that may be normal to the base 130 or the flat support surface (e.g., a 90 degree angle). As to an angle of the display surface 144, it may be 90 degrees, greater than 90 degrees or less than 90 degrees. As to the display surface 154 of the computing device 150 as positioned with respect to the slot 134, it may be at an angle that is greater than 90 degrees such that it is tilted upwardly in a direction that can correspond to the direction of a user positioned in front of the computing device 100. For example, consider a direction that is substantially aimed at a height of a user's eyes.

As an example, a user may have a viewing zone that can be defined by limits such as an upper limit that corresponds to an angle of zero degrees and a lower limit that is measured downwardly from the upper limit. As an example, the viewing zone may have an optimal range of angles where, for example, the optimal range has a lower limit.

As an example, an optimal viewing angle for eyes may be defined according to the International Standards Organization (ISO ergonomics standards 9241-5). ISO 9241-5 states that an optimal viewing angle, or resting angle, is a −35 degree downward gaze angle from the horizon (e.g., at the level of the eyes). ISO 9241-5 also states that the optimal display placement is in a range of +/−15 degrees from the resting angle (e.g., −20 degrees to −50 degrees). Using the ISO 9241-5, a display surface may be optimally placed to be in a range of −20 degrees to −50 degrees relative to the horizon. The ISO 9241-5 range tends to be a bit lower than most users are accustomed for computer work, but is near a "normal" reading position as used by humans for many years. In this "normal" reading position, a display surface may be more appropriately called chest-height rather than head-height.

As to specific upper and lower limits of ISO 9241-5, it allows for a 0 degree horizontal gaze down to a −60 degrees gaze angle; noting that the lower limit of −60 degree angle may result in some amount of neck strain.

Figure 2:
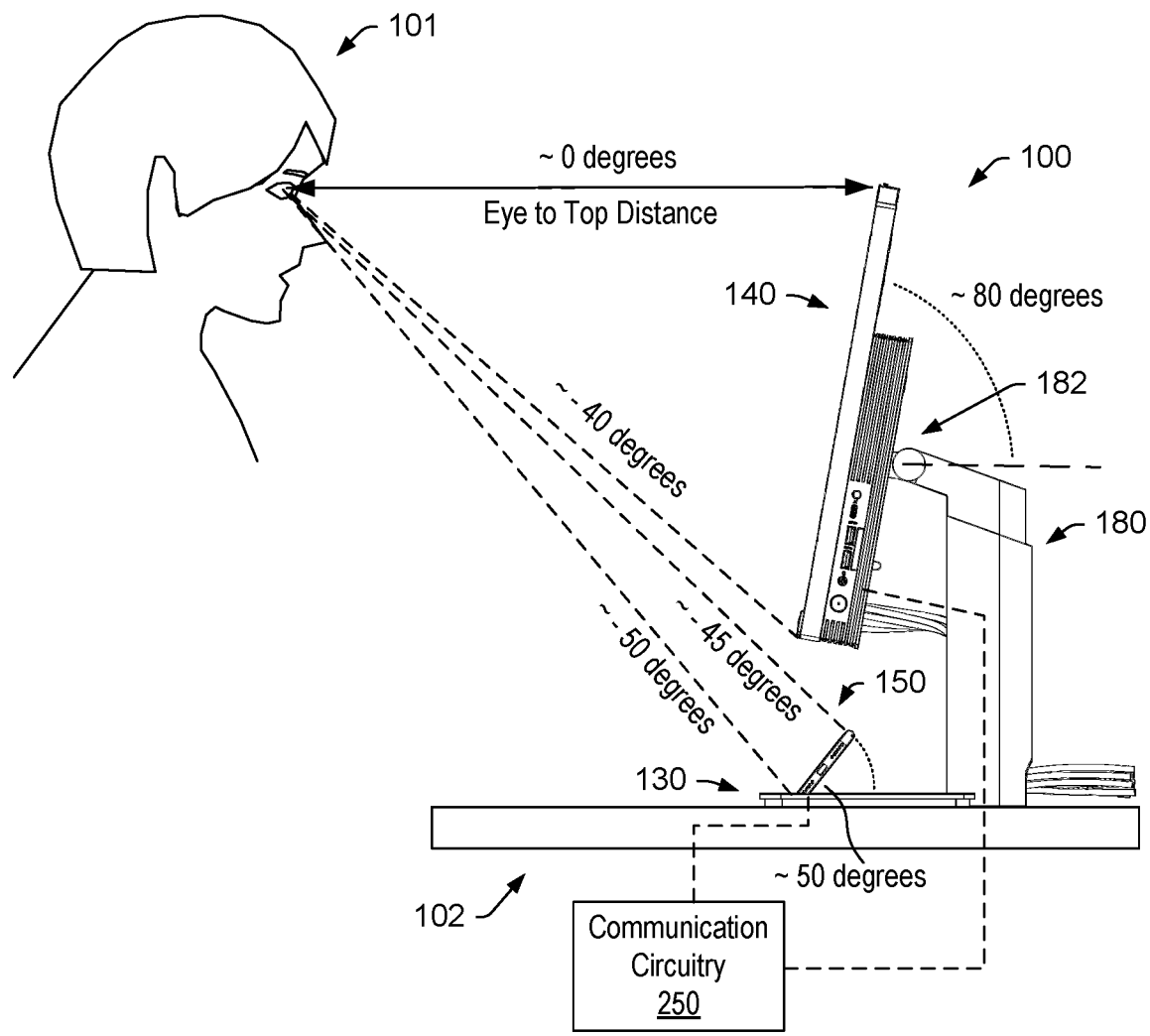
FIG. 2 is a side view of an example of the display device of FIG. 1.

FIG. 2 shows a side view of the device 100 with respect to a user 101 and a support surface 102. The position of the user 101 is given as an example, noting that a user may be positioned closer, further, higher or lower than the user 101 with respect to the device 100 and/or the support surface 102 may be positioned closer, further, higher or lower that the position shown with reference to the user 101.

In the example of FIG. 2, the display surface 144 of the display housing 140 is at an angle of approximately 100 degrees with respect to horizontal (see, e.g., angle of approximately 80 degrees as measured to the back side of the display housing 140) and the display surface 154 of the computing device 150 is at an angle of approximately 130 degrees with respect to horizontal (see, e.g., angle of approximately 50 degrees as measured to the back side of the computing device 150); thus, the angle of the display surface 154 of the computing device 150 can be greater than the angle of the display surface 144 of the display housing 140. As an example, the display housing 140 can be adjustable via the arm 180, for example, via an arm mount 182 such that the angle may be adjusted. As shown in the example of FIG. 2, the arm 180 is at approximately 90 degrees (e.g., normal to the support surface 102).

As to the user 101, various examples of view angles are illustrated, which include a range from approximately 0 degrees to approximately −40 degrees for the display surface 144 and a range from approximately −45 degrees to approximately −50 degrees for the display surface 154 of the computing device 150. In the example of FIG. 2, both display surfaces 144 and 154 may be considered to be within the range of 0 degrees to −60 degrees of the aforementioned ISO 9241-5 specifications.

As an example, a system may be a commercial system that is utilized at a customer service station such as a bank customer service station, a hotel customer service station, a store customer service station, etc. (e.g., consider a kiosk, etc.). Such a system may provide a clean visual experience for a user and a customer. Such a system may provide for clean aesthetic design of the customer service station such that one or more cables do not occupy space on a support surface or occupy minimal space. In such an example, a transaction may occur without annoyance of cable clutter when a user is handing a receipt, a pen, etc., to the customer and/or when the customer is handing a credit card, a smartphone, a smart card, etc., to the user.

As an example, the slot 134 may be a smart slot that includes a reader that can receive data from the computing device 150. For example, consider an electronic payment reader that includes circuitry (see, e.g., communication circuitry 250) that can receive payment information from the computing device 150 and/or that may transmit payment information to the computing device 150. As an example, electronic payment circuitry can be coupled to a housing and/or a stand where the electronic payment circuitry includes transmission and/or reception circuitry that can transmit payment information to a computing device disposed at least in part in a slot of a base of the stand and/or that can receive payment information from a computing device disposed at least in part in a slot of a base of the stand.

As an example, a customer may make a transaction with or without assistance from a user in that the customer may hand the computing device 150 to a user that places the computing device 150 in the slot 134 or in that the customer is the user and places her computing device 150 in the slot 134. As an example, a user can make selections using the display surface 144 and/or a peripheral (e.g., a scanner, etc., which may be the computing device 150) and then make a payment (e.g., a transaction) using the computing device 150 as inserted at least in part in the slot 134. In such an example, the user may see information rendered to the display surface 144 and to the display surface 154 to confirm that the payment was properly made. In such an example, the user may touch the display surface 154, if and/or when appropriate, to make one or more selections (e.g., to receive an emailed receipt, to confirm a transaction, etc.).

As an example, a customer/user can make various selections on the display surface 144 and place the computing device 150 (or other smart device) in the slot 134 where the customer/user can see both display surfaces 144 and 154 and make a transaction (e.g., touching either display surface, etc.). As an example, consider a hotel self-check-in example where a hotel includes the computing device 100, a user enters info on the display surface 144 with the computing device 150 in the slot 134, and "pay" circuitry is utilized for a transaction. As another example, consider shopping using the computing device 150 (e.g., as a scanner), placing the computing device 150 in the slot 134 where the computing device 100 receives via circuitry the shopping list, and where "pay" circuitry makes the transaction.

As an example, as to cable management, the computing device 100 can include an outer shell operatively coupled to the arm 180 that can lift up to reveal a channel (or channels) for one or more cables. In such an example, one or more cables can be laid in the channel (or channels) and the stand shell can be re-positioned capturing the one or more cables and hiding them from view. As an example, the computing device 100 can include cable management features that allow for easy cable routing, without having to thread connector ends through one or more openings. As an example, cable management can be performed where neither end of a cable needs to be disconnected from the computing device 100 or peripheral, electrical outlet, etc., to be routed through the stand. For example, one or more cables can be slid into the channel from a side opening and exit through an opening at a bottom (e.g., on the shell) when it is closed.

Figure 3:
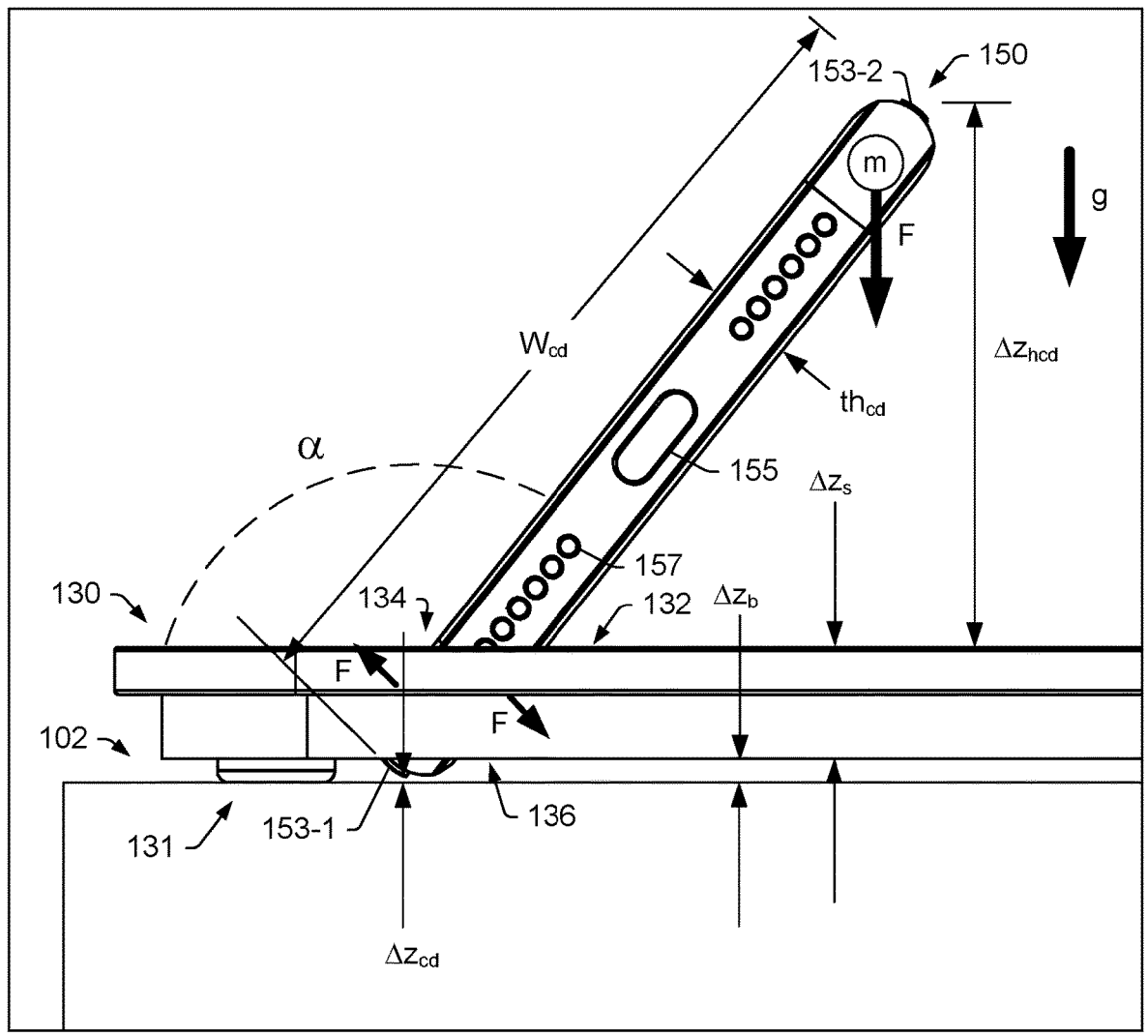
FIG. 3 is a side view of a portion of the display device including a computing device disposed in a slot of a base of the display device.

FIG. 3 shows a portion of the base 130 as being disposed on the support surface 102 where the base 130 includes at least one foot 131 and where the computing device 150 is disposed at least in part in the slot 134, which is shown to be a through-slot, for example, with an opening in the upper surface 132 of the base 130 and with an opening in a lower, opposing surface 136 of the base 130 (e.g., consider substantially parallel, opposing surfaces). In such an example, the surfaces 132 and 136 can define a slot height $\Delta z_s$. As shown in the example of FIG. 3, the computing device 150 does not contact the support surface 102; rather, there is a gap ($\Delta z_{cd}$) as defined at least in part by one or more features of the base 130 such as, for example, the foot 131 as shown; noting that there may be one or more additional feet or other structures that provide for a gap. As shown in the example of FIG. 3, the foot 131 can defined a base gap $\Delta z_b$, for example, between a lower surface of the foot 131 and the lower surface 136 of the base 130.

FIG. 3 shows various example of features the computing device 150, which can include one or more touch controls 153-1 and 153-2 (e.g., control buttons, etc.), one or more connectors 155, one or more speakers 157, etc. As shown, one of the one or more connectors 155 can be on a bottom edge and one or more of the one or more speakers 157 can be on the bottom edge. In the example orientation shown, the touch control 153-1 is inaccessible while the touch control 153-2 is accessible and the one of the one or more connectors 155 on the bottom edge is accessible along with the one or more of the one or more speakers 157 on the bottom edge.

In the example shown in FIG. 3, the computing device 150 has a mass m, a width $W_{cd}$ and a thickness $th_{cd}$. FIG. 3 also shows an example of orientation of the computing device 150 and the base 130 with respect to acceleration of Earth's gravity (g). In the example shown, various forces can act upon the computing device 150 and the base 130 where forces can be applied to opposing walls of the slot 134 as the computing device 150 is cantilevered, to form an overhanging portion includes a free end (e.g., bracing is achieved via the portion of the computing device 150 disposed in the slot 134). Given the mass m and angle α, various forces may be calculated.

As an example of a computing device, consider the following specifications 151 mm×76 mm×8.3 mm (L×W×th) that has a mass of approximately 200 grams (e.g., approximately 7 ounces). In such an example, a slot in a base can be longer than 151 mm and wider than 8.3 mm. As an example, as shown in FIG. 1, the base 130 can be a base of a computing device 100, which may be an all-in-one (AIO) type of computing device.

As an example, a slot can include a width that is in a range from approximately 5 mm to 20 mm, in a range from approximately 8 mm to approximately 15 mm, or in a range from approximately 10 mm to approximately 12 mm. As an example, consider a slot with a width of approximately 11.5 mm. In such examples, the width may be a minimum width of the slot, which may be closer to the top of the slot (e.g., the surface 132) than the bottom of the slot (e.g., the surface 136).

As an example, a slot can include a length that is in a range from approximately 50 mm to 300 mm, in a range from approximately 75 mm to approximately 250 mm, or in a range from approximately 100 mm to approximately 200 mm. As an example, consider a slot with a width of approximately 172 mm.

As an example, a slot can be configured to support a smartphone such as, for example, an PHONE® smartphone, a MOTO® smartphone, a SAMSUNG® smartphone, etc.

As an example, a slot may include an open end that extends to a side of a base. In such an example, the slot length may be measured from the side of the base inwardly. As an example, where a slot has an open end, a computing device may be positioned in the slot with a portion of the computing device extending beyond the side of the base. In such an example, the computing device may be doubly cantilevered, upwardly and outwardly.

As an example, the slot 134 may be configured to support the computing device 150 at an adjustable height. For example, consider the height $\Delta z_{hcd}$, which may be adjustable to a relatively small extent by adjusting one or more of the angle α and the amount of the portion of the computing device 150 received in the slot 134. As an example, for a given slot width, as thickness of a computing device is increased (e.g., via a case, model, etc.), the angle α can decrease (e.g., toward 90 degrees) while the standing height $\Delta z_{hcd}$ may increase.

As an example, the orientation of a computing device in the slot 134 may be adjustable. For example, consider a relatively rectangular computing device that includes a left edge, a right edge, a top edge and a bottom edge that can be oriented top edge up, bottom edge up, left edge up or right edge up. Such orientations may determine whether a display surface of the computing device is in a portrait or a landscape mode. In the portrait orientations, the height $\Delta z_{hcd}$ may be greater than in the landscape orientations. Such orientation-based adjustments can provide for height adjustments that may be greater than those achieved by adjusting one or more of the angle α and the amount of the portion of the computing device 150 received in the slot 134.

As shown in the example of FIG. 3, the computing device 150 can be supported at an angle α in the slot 134 of the base 130 without being in contact with a support surface. In such an example, a user may understand that a computing device can be supported in the slot 134 of the base 130 without undesirable contact between the computing device and a support surface that physically supports the base 130. Additionally, where the support surface may be a finely finished surface (e.g., a fine wood surface, a glass surface, etc.), there is a reduced risk of a computing device scratching or otherwise damaging the finely finished surface. For example, consider a situation where a computing device does contact a finely finished surface and where the computing device and/or a base is moved such that frictional contact occurs, which may cause undesirable wear, damage, etc., to one or both of the computing device and the finely finished surface. Such an approach can, for example, provide a gap that is sufficient to avoid contact with one or more controls of a computing device such as, for example, one or more control buttons (e.g., to avoid accidental actuation of a control button, etc.).

Figure 4:
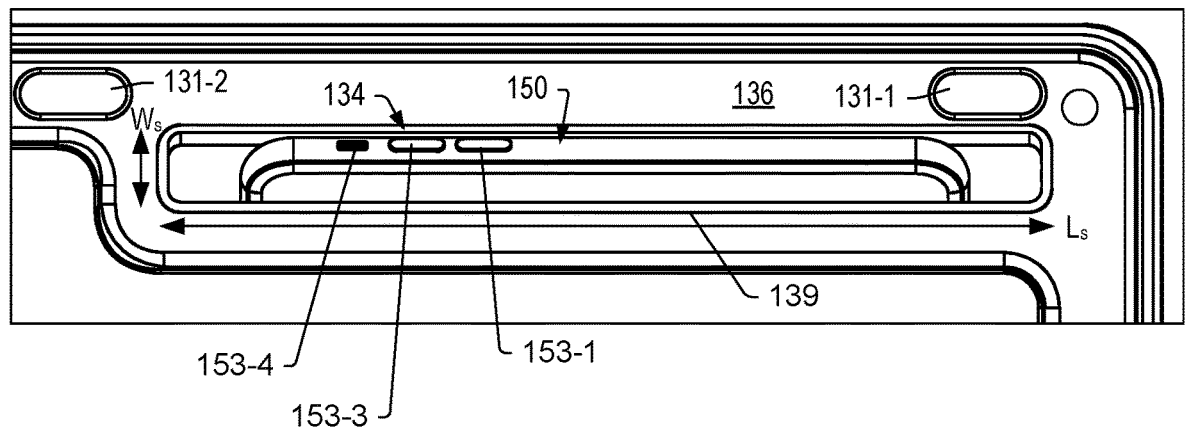
FIG. 4 is a bottom view of a portion of the arrangement of FIG. 3.

FIG. 4 shows a portion of the base 130 in a view from a lower surface 136 of the base 130 where the base 130 can include feet 131-1 and 131-2, which may be proximate to the slot 134. FIG. 4 also shows a lower surface opening 139 in the lower surface 136.

In FIG. 4, the computing device 150 is disposed at least in part in the slot 134, which is shown to be a through-slot, for example, with the upper surface opening 137 in the upper surface 132 of the base 130 and with the lower surface opening 139 in the lower, opposing surface 136 of the base 130. As an example, a slot dimension (see, e.g., $\Delta z_s$) can be defined as a distance between the openings 137 and 139. As an example, such a distance may be less than approximately 75 mm, less than approximately 50 mm, or less than approximately 25 mm and, for example, greater than approximately 3 mm, greater than approximately 5 mm, greater than approximately 7.5 mm, or greater than approximately 10 mm.

In FIG. 4, the computing device 150 is shown as including one or more controls 153-1, 153-3 and 153-4 (e.g., buttons, etc.) that may extend outwardly from a housing of the computing device 150. As mentioned, a gap can exist between the computing device 150 and a support surface (see, e.g., the support surface 102 of FIG. 3) such that the one or more controls 153-1, 153-3 and 153-4 of the computing device 150 do not contact the support surface.

In the example of FIG. 4, a slot length $L_s$ and a slot width $W_s$ are shown such that the slot 134 is substantially rectangular and of dimensions that can be sufficient to accommodate various types of computing devices. As an example, the slot width $W_s$ and slot length $L_s$ may be sufficient to accommodate a computing device in a case such as, for example, a smartphone in a case that fits about at least a portion of a housing of the smartphone (e.g., consider an aftermarket case).

In the example of FIG. 4, the slot 134 is shown as being positioned proximate to a corner of the base 130 and as extending substantially parallel to a front edge of the base 130. As an example, a base may be thicker in a slot region to provide for depth (e.g., thickness) sufficient to accommodate a computing device and to securely position the computing device at a desired angle.

As an example, the display surface 154 of the computing device 150 may be a touchscreen display such that a user can touch the touchscreen display to instruct the computing device 150. As mentioned, the gap may help to reduce risk of undesired contact of the computing device 150 and a support surface. As an example, a slot may be configured to provide support to a computing device such that the computing device remains relatively stationary when a user interacts with the computing device via one or more touch surfaces (e.g., a control button, a touchscreen display, etc.). In such an example, where a gap exists, the slot may be configured such that the gap does not diminish responsiveness to touching of the computing device via one or more touch input mechanisms of the computing device (e.g., touchscreen display, control buttons, etc.). As an example, a slot can be configured to snuggly secure a computing device such that touching forces can be applied to one or more touch input mechanisms without the computing device experiencing movement that would re-position the computing device in the slot.

As an example, a computing device may be wedged in a slot such that opposing surfaces of the computing device contact opposing walls of the slot. In such an example, the computing device can have an overhanging or cantilevered portion with a free end where the mass of the computing device (e.g., the overhanging or cantilevered portion) can, under acceleration of gravity, apply forces to the opposing walls of the slot.

As an example, a device can be a display device that may be a computing device such as an all-in-one (AIO) computing device. As an example, a device can include a base that includes an upper surface and an opposing lower surface and a slot that includes an upper surface opening in the upper surface, a lower surface opening in the lower surface, a slot width that is greater than approximately 5 mm and less than approximately 25 mm and a slot length that is greater than approximately 50 mm and less than approximately 300 mm; an arm operatively coupled to the base; and a display housing operatively coupled to the arm, where the display housing includes display circuitry and a display surface.

Figure 5:
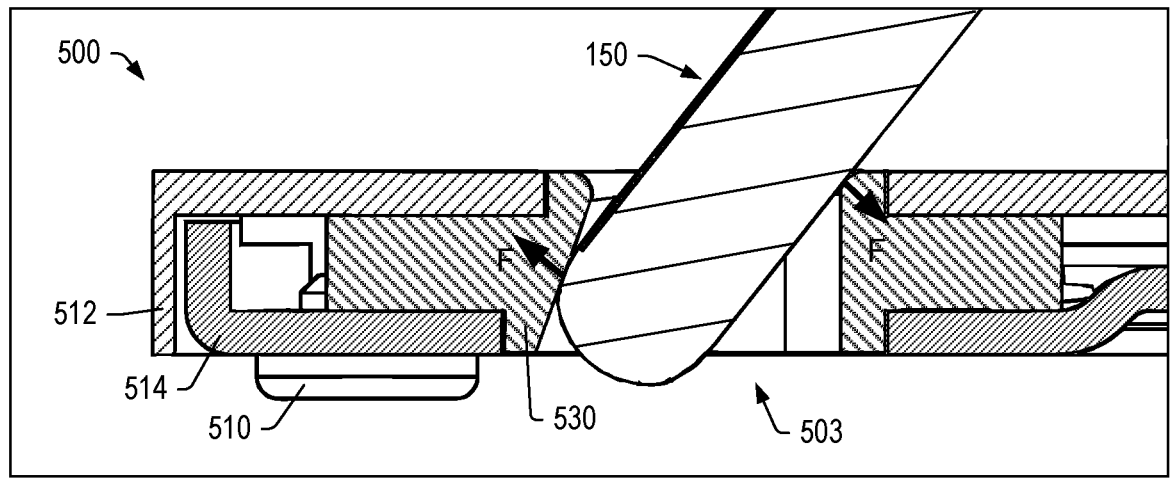
FIG. 5 is a cut-away view of a portion of an example of a base including a computing device disposed in a slot of the base.

FIG. 5 shows an example of a portion of a base 500 that includes the computing device 150 disposed in a slot 503 of the base 500. As shown in the example of FIG. 5, the base 500 can be an assembly that includes a cover 512 that fits to a structural chassis 514 where finish material may be fit to the cover 512 (e.g., to form a desired finish on an upper surface of the base 500). As mentioned, a base can include one or more feet or other contact structures for contacting a support surface. In the example of FIG. 5, a foot 510 is shown as being coupled to the structural chassis 514.

As shown in the example of FIG. 5, material 530 can be fit within an interior space of the base 500 where the material 530 can define one or more walls of the slot 503. As an example, the material 530 may be a unitary piece of material that can be positioned during an assembly process and/or may be pieces of material that can be positioned during an assembly process.

As an example, the material 530 can be resilient and provide sufficient counteracting force to secure the computing device 150. As an example, the material 530 can be shaped to provide for secured support of the computing device 150 at a desired angle. For example, in FIG. 5, a front portion of the material 530 is sloped, which can help to achieve and maintain the angle of the computing device 150 as shown.

In the example of FIG. 5, force arrows labeled F are shown where a front force arrow corresponds to a point, points or line of contact that is deeper in the slot 503 that of a back force arrow that corresponds to a point, points or line of contact that is shallower in the slot 503. As an example, the forces may be substantially equal and opposite such that the computing device 150 is in a static arrangement. As an example, small levels of vibration may be damped by the material 530, which may help to maintain the position (e.g., steadiness) of the computing device 150.

As an example, the material 530 may be provided in the form of an insert that is resilient and deformable for insertion and, after insertion, to be maintained securely with respect to the base 500 to define at least a portion of the slot 503. As an example, the material 530 can have a first shape when the slot 503 is empty and a second, deformed shape when the slot 503 has a computing device disposed at least in part therein. For example, a computing device may be wedged into the slot 503 where there is some amount of deformation of the material 530, which, as mentioned, can be resilient material that returns to a free-shape once an applied force is removed. As an example, a wedging process for a computing device can apply an amount of force to the material 530 that causes the material 530 to deform slightly and apply a spring-like force to the computing device. In such an example, the force involved is less than a force that would bend or otherwise damage the computing device and the wedging process is a process that can be performed via a single hand of a user. A computing device can be of a stiffness such that an overhanging or cantilevered portion of the computing device does not bend under its own weight.

The example of FIG. 5 illustrates the slot 503 as being a through-slot. A through-slot can be, in various environments, more sanitary than a closed slot. For example, a closed bottom slot may gather dust, debris, germs, etc.; whereas, a through-slot allows such substances to pass through to an underlying support surface. Where a user desires to clean the support surface, the base 500 may be moved, which may, depending on a wedge force, may not disturb the position of a computing device positioned at least in part in the slot 503.

As to the material 530, it may be selected such that it does not mark or otherwise damage a computing device (e.g., a display surface, a glass surface, a polished metal surface, etc.). As an example, the material 530 can be a polymeric material. As an example, the material 530 can be an elastomeric material. As an example, the material 530 can be a rubber (e.g., natural and/or synthetic rubber). As an example, the material 530 can be co-molded with one or more other pieces of a base, which may be a base of a stand that supports a display, an all-in-one (AIO) computing device, etc. As an example, the material 530 can be co-molded with a plastic such as a thermoplastic polymeric material (e.g., acrylonitrile butadiene styrene (ABS)). As an example, the material 530 can be a thermoplastic polymeric material such as, for example, ABS. As an example, the material 530 can be a material that is softer than ABS such that a user may view the material 530 as being gentle to accommodate a computing device such as a smartphone without risk of damage to the computing device. For example, the material 530 may have a Shore D hardness that is less than approximately 75.

As an example, a slot can be formed and defined at least in part by one or more walls that is made at least in part of a material that has a Shore hardness less than approximately Shore D 75, less than approximately Shore D 50, less than approximately Shore A 70, less than approximately Shore A 40, less than approximately Shore A 20, or less than approximately Shore 00 50. As an example, a slot can be formed and defined at least in part by one or more walls that is made at least in part of a material that has a hardness greater than approximately Shore 00 10, which may, for example, be considered a lower value of one or more ranges. As an example, a rubber may be a medium soft rubber such as that of a pencil eraser, which may have a Shore A harness of approximately 40 and a Shore 00 hardness of approximately 80.

In the example of FIG. 5, the structural chassis 514 may be made of metal or metallic alloy. As an example, the cover 512 may be made of a polymeric material. As an example, finish material may be a polymeric material, a metal, a metallic alloy, etc.

Figure 6:
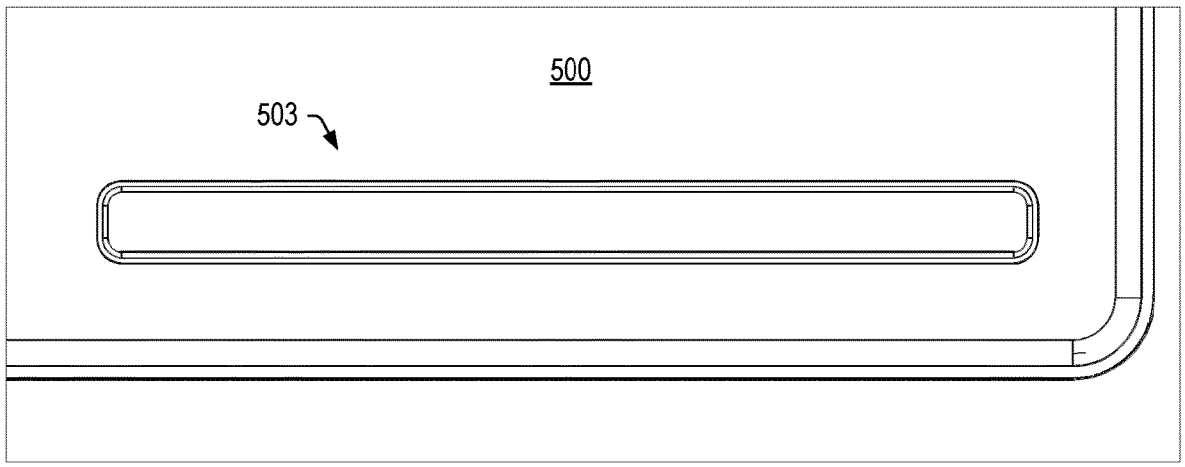
FIG. 6 is a plan view of a portion of the slot of FIG. 5.

FIG. 6 shows a top view of a portion of the base 500 with the slot 503 without a computing device. From the top view, the perimeter of the slot 503 may appear substantially even; while, from a bottom view, the perimeter of the slot 503 may appear uneven in that the fore wall may appear thinner than the back wall due to a slope in the fore wall (see, e.g., the material 530 of FIG. 5). In such an approach, the slot 503 may appear aesthetic to a user. As an example, the slot 503 may be finished in a particular finish, color, etc. For example, consider a black base with a red slot, which may be achieved by utilizing the material 530 in a red color. In such an approach, a user's eyes can be attracted to the slot 503, which may cause the user to investigate further one or more functions of the slot 503.

Figure 7A:
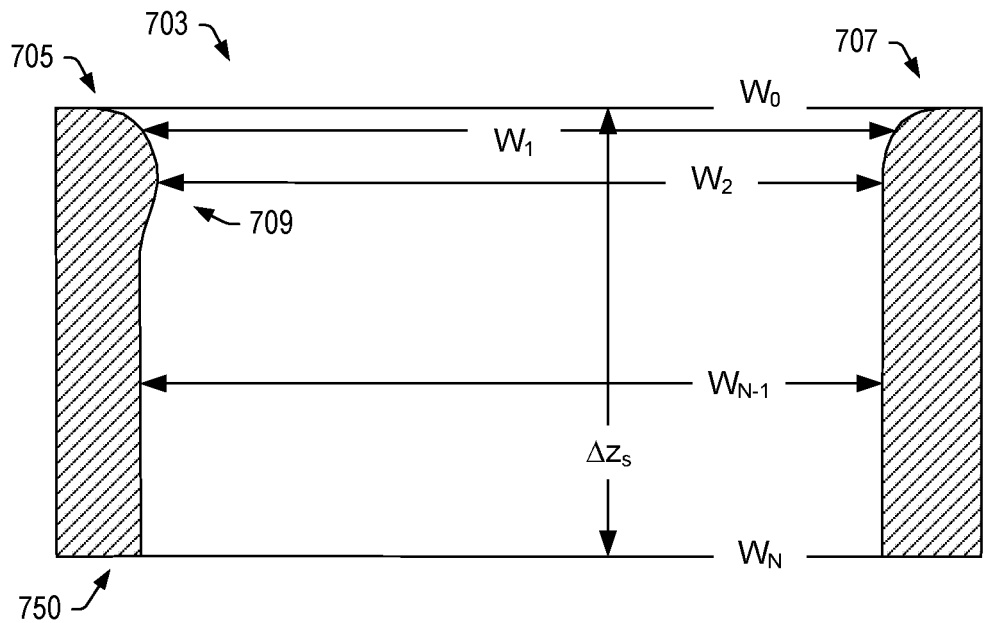
FIGS. 7A and 7B are cross-sectional views of a portion of a slot of a base.
Figure 7B:
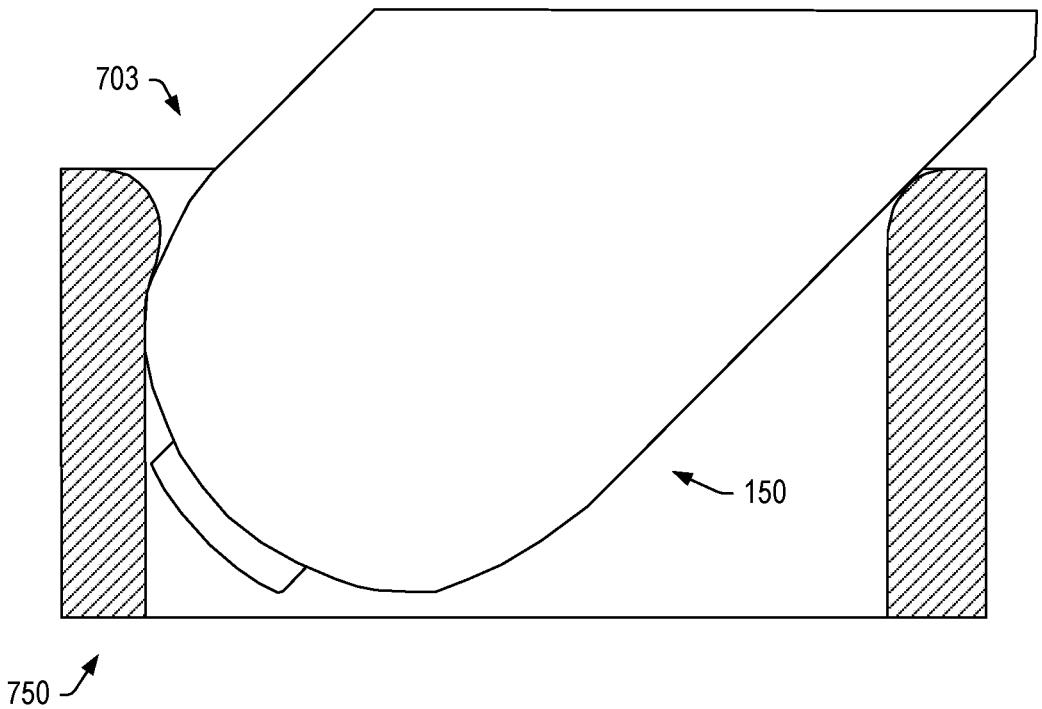

FIG. 7A and FIG. 7B show a cross-sectional view of an example of a slot 703 as formed by material 750, which includes various width dimensions $W_0$, $W_1$, $W_2$, $W_{N-1}$, $W_N$ at various heights along a z-axis, which indicates a slot dimension $\Delta z_s$. As shown, the slot 703 includes a front wall 705 and a back wall 707 where a profile of the front wall 705 in the cross-sectional view differs from that of the back wall 707. As shown, the front wall 705 includes a protruded portion 709 that decreases the width of the slot 703 when compared to the width $W_0$, which is at the top opening of the slot 703. The slot 703 can have a minimum width that within the top 50 percent of the slot height as indicated by the slot dimension $\Delta z_s$. As an example, the slot 703 can have a minimum width that is within the top third of the slot height (e.g., top 33 percent). As shown, the slot 703 can have a substantially constant width section, for example, below the protruded portion 709 (e.g., which may be referred to as a protrusion or a lip).

As an example, the material 750 can be one or more of the materials as mentioned as to the material 530. As an example, a slot can include one or more materials that form a front wall and a back wall. As an example, the materials may be the same for a front wall and a back wall. As an example, shape of a front wall can differ from shape of a back wall. As an example, a front wall may be expected to contact a glass material (e.g., GORILLA glass (Corning, Inc., Corning, N.Y.), sapphire glass, etc.). As an example, the front wall may be expected to maintain contact with a glass material where the glass material is dirty as may include oil and water as dirt. As an example, a back wall may be expected to maintain contact with a metallic material, a plastic material, etc., as may be part of a back side of a computing device.

As an example, a slot can include material of a front wall and material of a back wall that contact a computing device in a manner that distributes the contact and that distributes the force. For example, a slot can include a front wall that provides for contact along a line and a back wall that provides for contact along a line.

As an example, where airflow may be desired through the slot while a computing device is disposed in part therein, a front wall and/or a back wall may provide for point contact. For example, consider an undulating front wall and/or an undulating back wall. In such examples, air may flow to help cool the computing device during one or more operations (e.g., during execution of one or more apps, during a video conference call (e.g., FACETIME call, etc.) that may utilize a camera or cameras of the computing device, during charging, etc.). In such an example, the temperature of the computing device may remain relatively stable such that material of a slot and/or one or more of contact, friction and force between material and the computing device do not change in a manner that might lead to sliding, etc. As an example, a front wall of a slot may include a plurality of protrusions (e.g., bumps) that can contact a glass material of a smartphone to provide for securing the smartphone in the slot at an angle α. Such a front wall may be made of a polymeric material that is of a lesser hardness than the glass material where the polymeric material may be elastic (e.g., for elastic deformation). As an example, a number of protrusions of a wall of a slot may be greater than two along a length of the slot.

FIG. 7B shows the cross-sectional view with the computing device 150 positioned in part therein. In the example of FIG. 7B, the computing device 150 does not extend to the bottom of the slot 703. As shown, the material 750 may be resilient such that it deforms slightly responsive to force applied by the computing device 150.

In the example of FIG. 7B, where the computing device 150 is disposed deeper within the slot 703, the angle α may change to become lesser such that the computing device 150 becomes more upright. As an example, where the width of the slot 703 is greater than that of the computing device 150, the computing device 150 may be stood upright in a manner where the computing device 150 extend to and contacts a support surface (e.g., a desktop, a tabletop, a countertop, etc.).

Figure 8A:
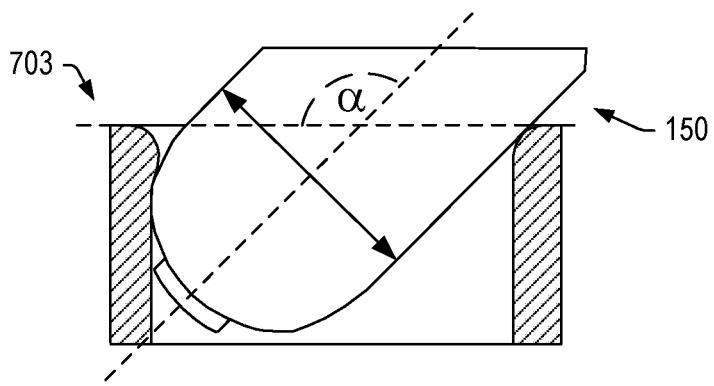
FIGS. 8A, 8B and 8C are cross-sectional views of a portion of a slot of a base with respect to different computing devices.
Figure 8B:
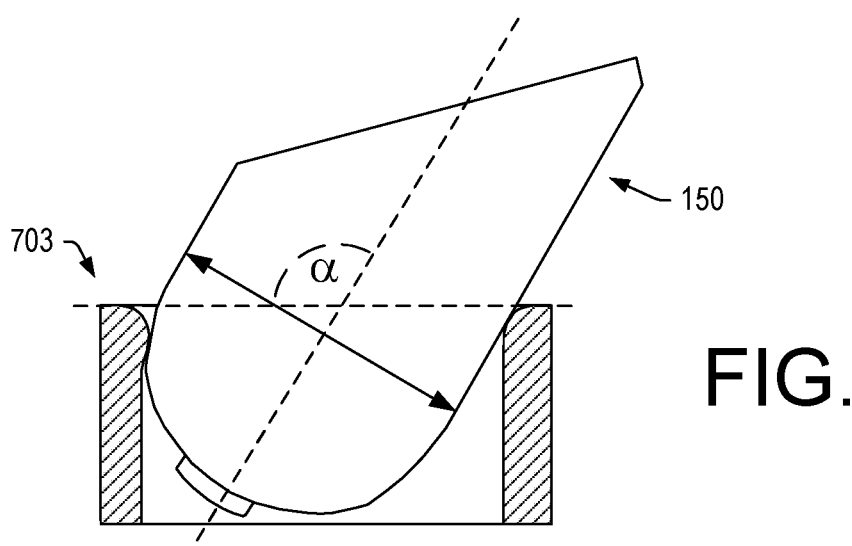
Figure 8C:
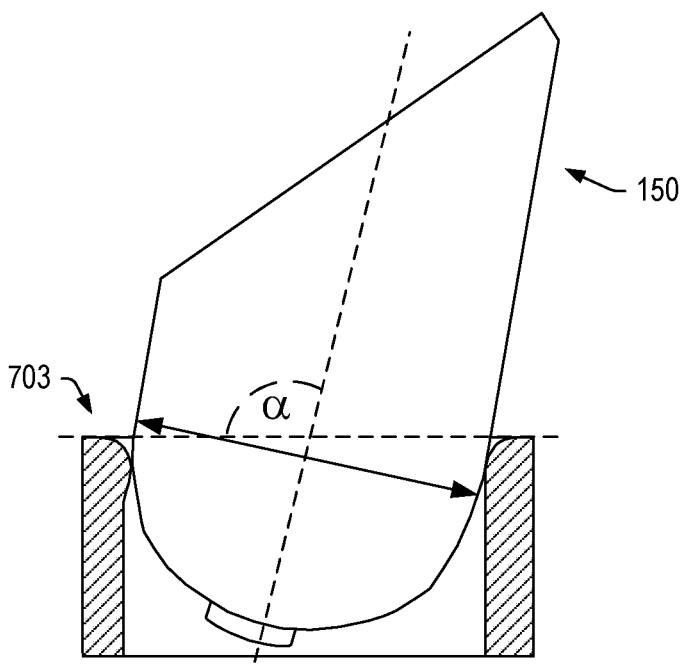

FIG. 8A, FIG. 8B and FIG. 8C show examples of a slot 803 with different computing devices 850-1, 850-2 and 850-3. As shown, the computing devices 850-1, 850-2 and 850-3 differ as to their width, which may be due to the specifications as manufactured and/or due to a case such as an aftermarket case. In the examples shown, the angles α are at approximately 135 degrees, approximately 122 and approximately 104 degrees, respectively. As to the thickness of the computing devices 850-1, 850-2 and 850-3 to the width of the slot 803 at the protrusion, they are approximately 0.68, approximately 0.88 and approximately 0.98, respectively. As shown, as the thickness of the computing device increases, for a given slot width, the angle α can decrease. As an example, a user may position a computing device in a case to increase its thickness, for example, to facilitate decreasing its angle α when disposed at least in part in a slot of a base. As an example, a user may remove a computing device from a case to decrease its thickness, for example, to facilitate increasing its angle α when disposed at least in part in a slot of a base.

Figure 9A:
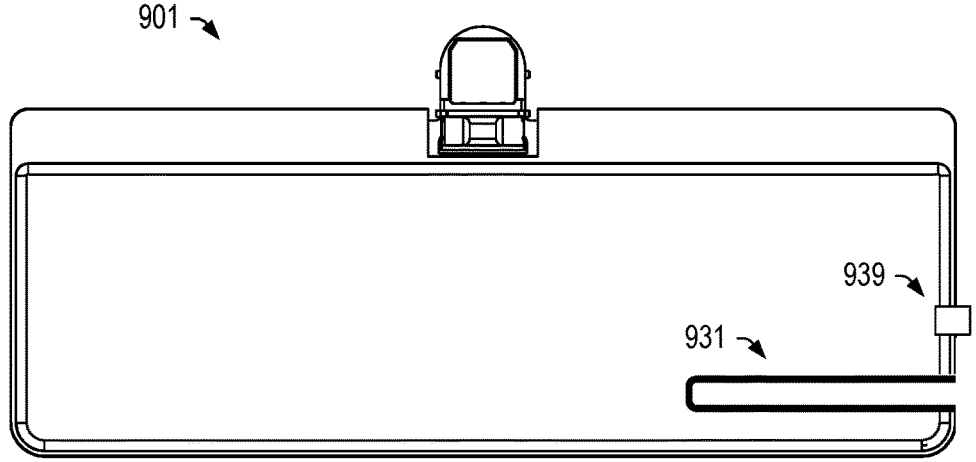
FIGS. 9A, 9B and 9C are plan views of examples of bases that include one or more slots.
Figure 9B:
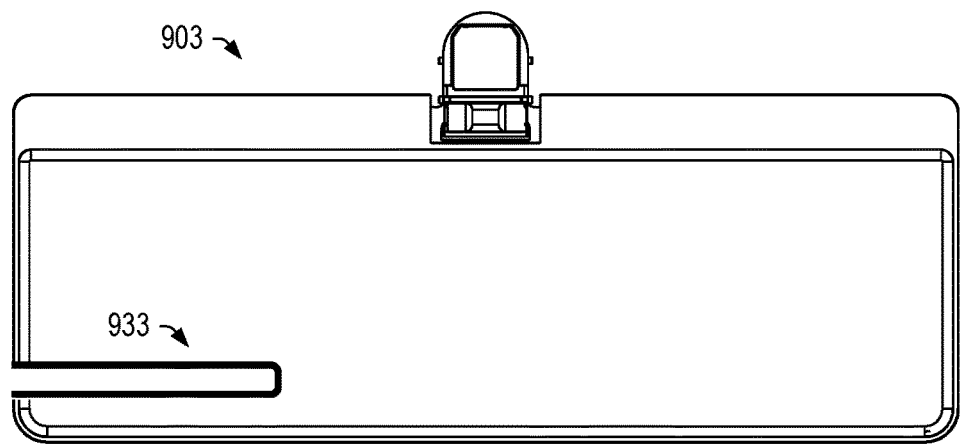
Figure 9C:
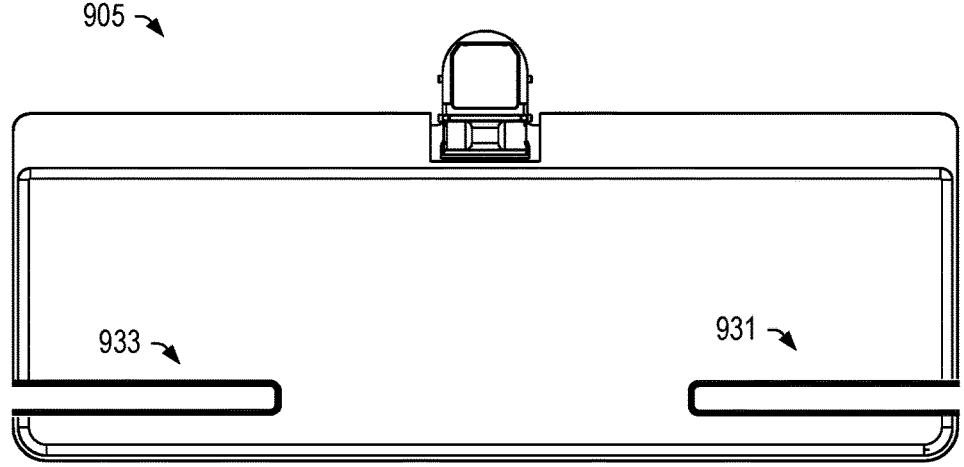

FIG. 9A, FIG. 9B and FIG. 9C show examples of bases 901, 903 and 905 with one or more slots 931 and 933, respectively. As shown, a base can include one or more slots, which can include one or more open ended slots and/or one or more closed ended slots. The base 901 includes a right side open ended slot 931, the base 903 includes a left side open ended slot 933 and the base 905 includes the right side open ended slot 931 and the left side open ended slot 933. As an example, an open ended slot may accommodate a computing device that may be of a width that is greater than the length of the slot. As an example, consider a slot with a length that corresponds to a length or a width of a smartphone where, for example, a tablet computing device that is larger in length and width than the smartphone may be positioned at least in part in the slot to stand it at an angle α.

As an example, a user may have two computing devices that can be positioned in one or more slots. For example, consider a user with two computing devices that utilize the two slots 931 and 933 of the base 905. In such an example, one may be a work smartphone while the other is a personal smartphone. In such an approach, a user may readily see and discern information rendered to a display of one or the other of the two smartphones. The user can be organized and operate efficiently in such an environment. As another example, one of the computing devices may be a media player device, for example, for viewing videos, listening to radio or music, etc. As another example, consider a lab worker where a portable timer is often used for timing laboratory experiments. The user may place the portable timer in a slot of a base that includes one or more slots while using a display device supported via the base, which may be, for example, an all-in-one (AIO) device.

In the example of FIG. 9A, a cord clip 939 is shown, which may be a plastic and/or metal clip that can be utilized to route a cord that may be connected to a connector of a computing device disposed in the slot 931. For example, consider a smartphone disposed in the slot where a charger cord is connected to a connector of the smartphone (see, e.g., the connector 155). In such an example, a user may route the charger cord via the cord clip 939 and toward the back of the base 901. As an example, a base may include wireless charging circuitry and/or a connector that can be utilized to charge a rechargeable battery of a computing device when it is disposed at least in part in a slot of the base.

As mentioned, a smartphone may have a width of approximately 76 mm. In such an example, consider a slot in a base that has a width that is greater than 76 mm, which may be a closed ended slot. As an example, a slot that is open ended at one end may be of a lesser width than 76 mm and still accommodate the smartphone, optionally in both of a portrait orientation and a landscape orientation. In such an example, where the slot has a length of approximately 70 mm and the smartphone has a length of approximately 151 mm, greater than 33 percent of the length of the smartphone may be disposed in the slot. In such an example, the slot may be made of a material that can provide sufficient friction to grip the smartphone and support it in a double cantilevered arrangement.

As an example, a user may place her smartphone on her desk, when not holding on to it or, for example, when charging it. Desks tend to be cluttered spaces and a smartphone (or smartphones) can be easily misplaced or lost under papers, etc. When a smartphone is lying on a desk, its display can be difficult to see, which may require a user to pick it up to read a text or answer a call.

More smartphone users are keeping their smartphones on a desk rather than in a pocket, which may be due to an increasing awareness as to increasingly more powerful devices, which may emit greater levels of electromagnetic energy (e.g., RF, etc.) and pose potential issues when a device is held too close to the skin for too long of a period of time, to close to a particular part of the body for too long of a period of time, or to close to one or more other devices (e.g., a pacemaker, a credit card, etc.).

As explained, a base can include a slot that can be a phone prop slot for supporting a smartphone at an angle. As mentioned, such a base can be a base of a stand that supports a display (e.g., a monitor) or, for example, a computing device such as an AIO device.

As an example, a length of a slot can allow for various different makes and models of smartphones to be placed vertically or horizontally and to angle the display toward a user. Through integration into a base of a stand, the slot can be provided in a manner that takes up no additional desk space, provides a convenient placement for viewing (being aligned with a display screen) and gives the smartphone a home, preventing misplacement.

As mentioned, a slot width can set to hold various make and model smartphone thicknesses. As an example, a front side and/or a bottom edge of a smartphone can be pressed at least in part against a front wall of a slot, whilst the back of the smartphone rests on a back wall (e.g., rear wall) of the slot. A smartphone can be held firmly in place at a cantilevered angle, enabling touching of a touchscreen display without the smartphone falling backwards. As shown in various examples, such as in FIG. 3, when a computing device such as a smartphone is placed in a slot horizontally, a connector such as a charging port can be readily accessible. As such, a user does not necessarily have to remove the smartphone from the slot to connect a charging cord.

As an example, a slot can be a feature without moving parts. For example, it may be a structure that can deform elastically responsive to force applied by a computing device such as a smartphone. As an example, where a slot is formed from a material of a hardness that does not deform in response to force applied by a computing device, the slot may be considered to be a completely static feature.

As an example, a device can include a base that includes an upper surface and an opposing lower surface and a slot that includes an upper surface opening in the upper surface, a lower surface opening in the lower surface, a slot width that is greater than approximately 5 mm and less than approximately 25 mm and a slot length that is greater than approximately 50 mm and less than approximately 300 mm; an arm operatively coupled to the base; and, a display housing operatively coupled to the arm, where the display housing includes display circuitry and a display surface.

In such an example, the device can include a processor and memory accessible by the processor, where the display circuitry is operatively coupled to the processor. In such an example, the processor and the memory can be disposed in the display housing.

As an example, a slot can include a front wall and an opposing back wall where a slot width is a distance between the front wall and the opposing back wall, where the slot width can be greater than approximately 5 mm and less than approximately 25 mm. In such an example, an upper point on the front wall and a lower point on the front wall can define a slope. In such an example, the upper point can corresponds to a protrusion.

As an example, a slot can include a front wall and an opposing back wall where a slot width is a distance between the front wall and the opposing back wall, where the slot width can be greater than approximately 5 mm and less than approximately 25 mm. In such an example, the front wall can be a polymeric material or include a polymeric material.

In such an example, the polymeric material can be rubber or include rubber. As an example, a base, in which a slot exists (e.g., passes through), can be or can include a metallic chassis. For example, consider a base with a slot where a polymeric material, that at least in part defines the slot, contacts a metallic chassis of the base (e.g., a metallic surface contacting a polymeric material surface, optionally with a coating therebetween such as a lubricant to ease insertion, an adhesive to secure the polymeric material, etc.). In such an example, the metallic chassis can provide structural rigidity for the polymeric material, which may be resilient. In such an example, the metallic chassis can limit distortion of the polymeric material, which may be an insert (or inserts) (e.g., separate piece(s), co-molded polymeric material with one or more other features, etc.) positioned in an opening of the base to at least in part define the slot. As an example, polymeric material may form a free perimeter that faces an open area of a through slot of a base and a fixed perimeter that is supported structurally by a rigid chassis of the basis (e.g., a metallic chassis or other rigid material that is more rigid than the polymeric material). As an example, a base may be made of one or more types of materials that can be sufficiently rigid to structurally support a resilient material or resilient materials that at least in part defines a slot in the base where the slot can receive, for example, at least a portion of a mobile device such as, for example, a mobile phone (e.g., a smartphone, etc.).

As an example, a base can include a plastic cover and a metallic chassis where polymeric material contacts at least the plastic cover. In such an example, the polymeric material can contact the metallic chassis (e.g., contact the plastic cover and contact the metallic chassis). In such an example, the plastic cover can contact the metallic chassis. For example, a metallic chassis of a base can provide structural support for a plastic cover of the base and can provide structural support for polymeric material that defines at least a portion of a slot in the base. In such an example, the slot can be a through opening (e.g., a through slot) where a line of sight exists from one side of the base to another, opposing side of the base.

As an example, a base can include a polymeric cover piece where a slot of the base is co-molded with the polymeric cover piece. In such an example, the slot can be co-molded and can include a front wall and a back wall, which can define a slot width where the slot width can be, for example, greater than approximately 5 mm and less than approximately 25 mm.

As an example, a slot in a base can include an open end and a closed end. For example, consider a through slot in a base that is open at one end and closed at another, opposing end. In such an example, a user may position a mobile device in the slot by translating the mobile device laterally (e.g., horizontally) such that the mobile device is at least in part received in the slot. In such an example, a user may alternatively position a mobile device in the slot by inserting it from above (e.g., an upper surface of the base, moving the mobile device vertically). In such examples, the mobile device can be supported in the slot without contacting a supporting surface that is below the base (e.g., a desktop surface, etc.).

As an example, a slot in a base can include opposing closed ends. In such an example, the slot can be defined by a perimeter, which can be an interior perimeter. As an example, a front wall and a back wall can define at least in part an interior perimeter of a slot where, for example, a side wall can define at least in part the interior perimeter of the slot. Where a slot includes opposing side walls (e.g., end walls), the opposing side walls can define at least in part the interior perimeter of the slot.

As an example, a base may include more than one slot where each of the slots may be the same or may be different (e.g., as to dimensions, material(s), etc.). As an example, a base can include a first slot and a second slot. In such an example, the base can receive a first mobile device at least in part in the first slot and can receive a second mobile device at least in part in the second slot.

As an example, a base can include a distance between an upper surface and a lower surface that is less than approximately 50 mm. In such an example, a slot dimension can be defined between the upper and lower surfaces. As an example, a base can include one or more feet that extend from a lower surface of the base. In such an example, a mobile device received at least in part in a slot of the base may or may not extend below the lower surface where, if it extends below the lower surface, it may not extend to the level of the bottom of the feet such that the mobile device does not contact a support surface upon when the bottom of the feet are in contact and thereby supported.

As an example, an assembly can include a housing that includes a processor, memory accessible to the processor, a display operatively coupled to the processor, and a mount; and a stand that couples to the mount and that includes a base that includes an upper surface and an opposing lower surface and a slot that includes an upper surface opening in the upper surface, a lower surface opening in the lower surface, a slot width that is greater than approximately 5 mm and less than approximately 25 mm and a slot length that is greater than approximately 50 mm and less than approximately 300 mm. Such an assembly can include, for example, a computing device disposed at least in part in the slot. In such an example, the base may be disposed on a support surface where a gap exists between the computing device and the support surface such that the computing device does not directly contact the support surface. For example, consider a mobile computing device (e.g., a mobile device such as a smartphone) that includes a display that can be disposed at an angle that is viewable by a user positioned in front of the display of the housing such that the user can view multiple displays. In such an example, the slot can secure the mobile computing device in a manner whereby the user may touch the display (e.g., as a touchscreen display) to cause the mobile device to perform one or more actions.

As an example, an assembly can include a housing that includes a processor, memory accessible to the processor, a display operatively coupled to the processor, and a mount; and a stand that couples to the mount and that includes a base that includes an upper surface and an opposing lower surface and a slot that includes an upper surface opening in the upper surface, a lower surface opening in the lower surface, a slot width that is greater than approximately 5 mm and less than approximately 25 mm and a slot length that is greater than approximately 50 mm and less than approximately 300 mm. In such an example, the assembly can include electronic payment circuitry that operatively couples to a computing device disposed at least in part in the slot for at least one of transmission of payment information to the computing device and reception of payment information from the computing device, where, for example, the electronic payment circuitry is coupled to at least one of the housing and the stand.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 10:
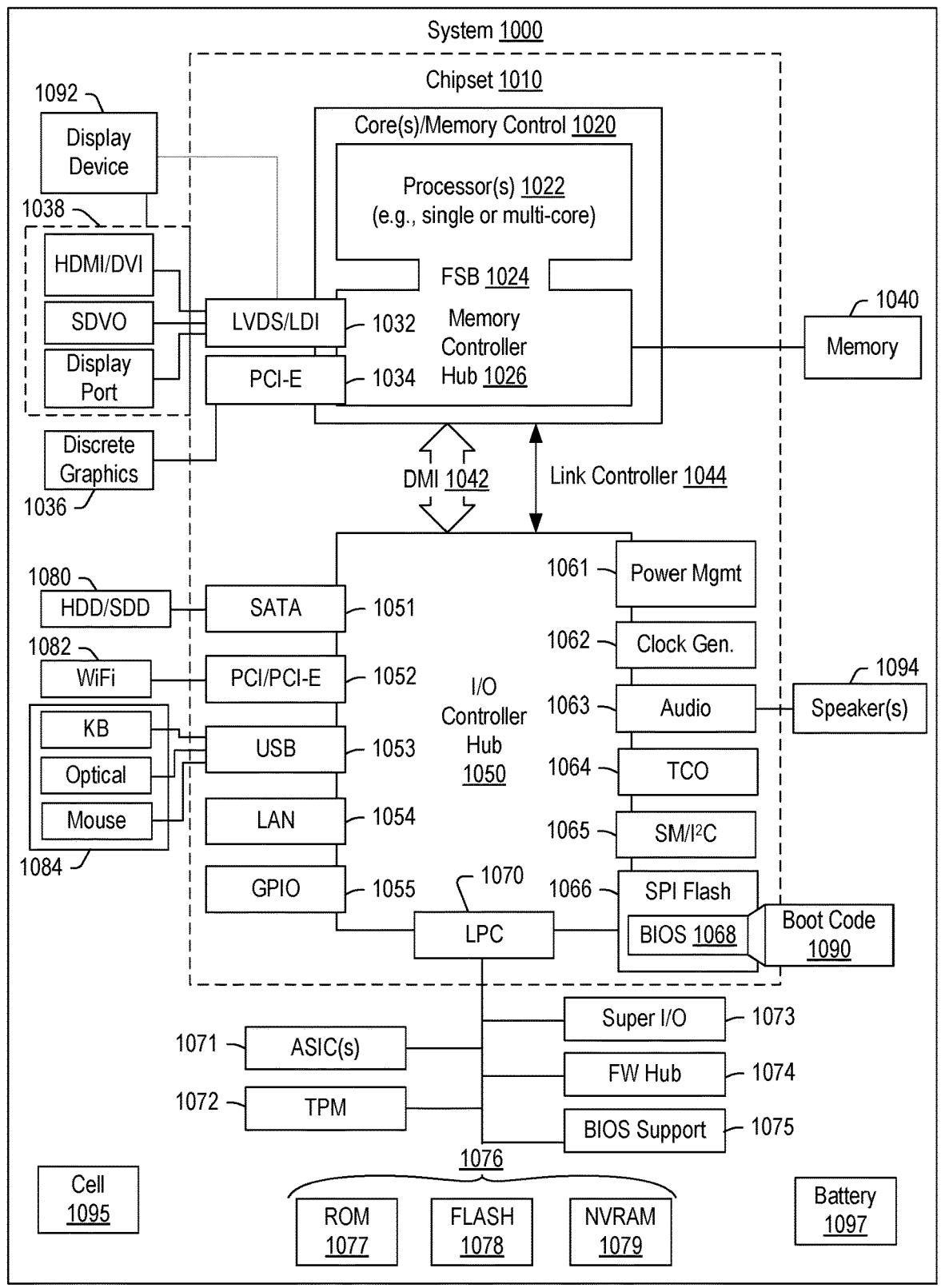
FIG. 10 is a diagram of an example of a system.

While various examples of circuits or circuitry have been discussed, FIG. 10 depicts a block diagram of an illustrative computer system 1000. The system 1000 may be a computer system sold by Lenovo (US) Inc. of Morrisville, N.C. (e.g., a THINKSTATION® system, etc.); however, as apparent from the description herein, a satellite, a base, a display, a computing device, a server or other machine may include one or more features and/or other features of the system 1000.

As an example, a monitor or display may include features such as one or more of the features included in one of the LENOVO® IDEADCENTRE® or THINKCENTRE® "all-in-one" (AIO) computing devices (e.g., sold by Lenovo (US) Inc. of Morrisville, N.C.). For example, the LENOVO® IDEADCENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 10, the system 1000 includes a so-called chipset 1010. A chipset refers to a group of integrated circuits, or chips, that are designed to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
   a base that comprises a front edge, a back edge, an upper surface and an opposing substantially planar lower surface and a mobile phone slot that is a through slot that comprises an upper surface opening in the upper surface, a lower surface opening in the lower surface, a slot width that is greater than approximately 5 mm and less than approximately 25 mm and a slot length that is greater than approximately 50 mm and less than approximately 300 mm, wherein the mobile phone slot comprises a front wall and an opposing back wall and wherein the slot width is a distance between the front wall and the opposing back wall;
   an arm operatively coupled to the base; and
   a display housing operatively coupled to the arm via an arm mount for angular adjustment of the display housing, wherein the display housing comprises display circuitry and a display surface, wherein the display housing is positioned above the base and adjustable via the arm mount to a 90 degree angle with respect to the substantially planar lower surface of the base and wherein a mobile phone having a thickness less than the slot width is cantilevered in the mobile phone slot at an angle greater than 90 degrees and less than 180 degrees with respect to the substantially planar lower surface and the front edge of the base, with a lower edge of the mobile phone extending below the lower surface opening of the mobile phone slot.

2. The device of claim 1 comprising a processor and memory accessible by the processor, wherein the display circuitry is operatively coupled to the processor.

3. The device of claim 2 wherein the processor and the memory are disposed in the display housing.

4. The device of claim 1 wherein an upper point on the front wall and a lower point on the front wall define a slope.

5. The device of claim 4 wherein the upper point corresponds to a protrusion.

6. The device of claim 1 wherein the front wall comprises a polymeric material.

7. The device of claim 6 wherein the polymeric material comprises rubber.

8. The device of claim 6 wherein the base comprises a metallic chassis and wherein the polymeric material contacts the metallic chassis.

9. The device of claim 6 wherein the base comprises a plastic cover and a metallic chassis and wherein the polymeric material contacts at least the plastic cover.

10. The device of claim 1 wherein the base comprises a polymeric cover piece and wherein the mobile phone slot is co-molded with the polymeric cover piece.

11. The device of claim 10 wherein the mobile phone slot is co-molded and comprises the front wall and the back wall.

12. The device of claim 1 wherein the mobile phone slot comprises an open end and a closed end that define the slot length.

13. The device of claim 1 wherein the mobile phone slot comprises opposing closed ends that define the slot length.

14. The device of claim 1 wherein the mobile phone slot comprises a first slot and further comprising a second slot.

15. The device of claim 1 wherein a distance between the upper surface and the lower surface is less than approximately 50 mm.

16. The device of claim 1 wherein the base comprises one or more feet that extend from the lower surface.

17. An assembly comprising:
a housing that comprises a processor, memory accessible to the processor, a display operatively coupled to the processor, and a mount; and
a stand that couples to the mount and that comprises a base that comprises a front edge, a back edge, an upper surface and an opposing substantially planar lower surface and a mobile phone slot that is a through slot that comprises an upper surface opening in the upper surface, a lower surface opening in the lower surface, a slot width that is greater than approximately 5 mm and less than approximately 25 mm and a slot length that is greater than approximately 50 mm and less than approximately 300 mm, wherein the mobile phone slot comprises a front wall and an opposing back wall and wherein the slot width is a distance between the front wall and the opposing back wall and wherein a mobile phone having a thickness less than the slot width is cantilevered in the mobile phone slot at an angle greater than 90 degrees and less than 180 degrees with respect to the substantially planar lower surface and the front edge of the base, with a lower edge of the mobile phone extending below the lower surface opening of the mobile phone slot.

18. The assembly of claim 17 comprising a mobile phone disposed at least in part in the mobile phone slot, wherein the base is disposed on a support surface and a gap exists between the mobile phone and the support surface such that the mobile phone does not directly contact the support surface.

19. The assembly of claim 17 comprising electronic payment circuitry that operatively couples to a mobile phone cantilevered in the mobile phone slot for at least one of transmission of payment information to the mobile phone and reception of payment information from the mobile phone, wherein the electronic payment circuitry is coupled to at least one of the housing and the stand.

20. The device of claim 1, comprising a keyboard wherein the upper surface of the base comprises a keyboard storage surface for the keyboard.

\* \* \* \* \*